United States Patent [19]
von Gutfeld

[11] Patent Number: 6,115,238
[45] Date of Patent: Sep. 5, 2000

[54] APPARATUS FOR LIMITING VIEWING ANGLE AND GLARE OF DISPLAY AND PORTABLE ELECTRONIC DEVICE EMPLOYING THE SAME

[75] Inventor: Robert Jacob von Gutfeld, New York, N.Y.

[73] Assignee: International Business Machines Corporation, Armonk, N.Y.

[21] Appl. No.: 08/984,263

[22] Filed: Dec. 3, 1997

[51] Int. Cl.[7] .............................. H05K 5/00; B65D 85/30
[52] U.S. Cl. ...................... 361/681; 361/681; 361/686; 361/682; 206/308.1
[58] Field of Search .................................. 361/681, 686, 361/682; 206/308.1

[56] References Cited

U.S. PATENT DOCUMENTS

| | | | |
|---|---|---|---|
| 5,027,111 | 6/1991 | Davis et al. | 340/784 |
| 5,255,214 | 10/1993 | Ma | 364/708.1 |
| 5,437,367 | 8/1995 | Martin | 206/320 |
| 5,652,694 | 7/1997 | Martin | 361/681 |
| 5,717,566 | 2/1998 | Tao | 361/681 |
| 5,996,786 | 12/1999 | McGrath | 206/308.1 |
| 6,002,484 | 12/1999 | Rozema et al. | 356/354 |
| 6,005,767 | 12/1999 | Ku et al. | 361/681 |

*Primary Examiner*—Leo P. Picard
*Assistant Examiner*—Tung Minh Bui
*Attorney, Agent, or Firm*—Whitham, Curtis & Whitham; Louis J. Percello

[57] ABSTRACT

An apparatus for limiting the viewing angle of a display (e.g., a liquid crystal display (LCD)) of an electronic device including a housing for housing the LCD, includes a pivoting device coupled to the housing, and a plurality of retractable flaps movable between first and second positions and respectively coupled to the pivoting device. The plurality of retractable flaps are for limiting a viewing angle of the LCD when the flaps are moved from the first position to the second position.

32 Claims, 2 Drawing Sheets

APPARATUS FOR LIMITING VIEWING ANGLE AND GLARE OF DISPLAY AND PORTABLE ELECTRONIC DEVICE EMPLOYING THE SAME

BACKGROUND OF THE INVENTION

The present invention generally relates to an apparatus for limiting a viewing angle and glare of a display (e.g., a liquid crystal display (LCD)) and a portable electronic device including such an apparatus, and more particularly to a mechanism attached to a display such that a display is shielded from glare and/or persons other than a user of the display.

DESCRIPTION OF THE RELATED ART

Portable computers such as laptops are often used in public places such as libraries, trains, planes etc. by business persons and others for recording or viewing information that becomes displayed on a liquid crystal (LC) flat panel.

Often, this information is confidential and proprietary to the user's business or organization, and should not be viewed or seen by any other person in the vicinity of the display. This need for privacy and security is often required especially on airplanes, trains, subways, etc. which are often congested and crowded, and where it is relatively easy for persons nearby to view the contents displayed.

While a number of attachments to the laptop computer such as lenses (e.g., in the form of zone plates) and the like have been developed to limit the viewing angle, such attachments have not been successful commercially and have been abandoned essentially.

Thus, portable personal computer (PC) products often are not "personal" enough, and persons other than the user oftentimes can view the display screen, thereby compromising sensitive information.

Further, the current security devices are attachable separately and cannot be simultaneously put in place or removed, without physically separating the device from the computer or other display system, a method found to be unattractive to the user.

Additionally, there is no inexpensive way of enhancing display privacy, without resorting to removable attachments.

Moreover, with the conventional displays, when the display is used outdoors or in bright sunlight, the display either must be moved to avoid the glare of direct sunlight, or the user must adjust the brightness/contrast dials on the display monitor. However, such adjustments oftentimes prove fruitless in direct sunlight, and viewing the screen is made difficult, if not impossible. Increasing brightness is an added burden on the battery of the computer whose service life is presently considered too short in between charging periods. These are problems of the conventional portable displays.

SUMMARY OF THE INVENTION

In view of the foregoing problems of the conventional devices, it is an object of the present invention to provide increased security of information displayed on portable personal computer (PC) products used by persons in crowded environments (e.g., trains, commuter vehicles, airplanes, etc.).

Another object is to ensure that persons other than the user cannot view the display screen, thereby preserving the confidentiality of sensitive information.

A further object is to provide a device for reducing glare originating from light sources external to the display.

Yet another object is to provide a device which does not need to be attached separately and simultaneously which can be rendered operable or inoperable without physically separating the device from the computer or other display system.

Another object is to provide an apparatus which, when the display is used outdoors or in bright ambient light (e.g., sunlight), the user can view the contents of the display without necessarily moving the display to avoid the glare of direct sunlight, and without necessarily adjusting the brightness/contrast dials on the display monitor.

In a first aspect of the invention, an apparatus for limiting the viewing angle of a liquid crystal display (LCD) contained in a housing of an electronic device according to the present invention, includes a plurality of retractable flaps coupled to the housing for limiting the viewing angle of the LCD when the flaps are unfolded from a first position.

Further, the invention provides an electronic device incorporating the above-described apparatus for limiting the viewing angle of a display therein.

With the unique and unobvious aspects of the present invention, increased security is provided for portable PCs and other products having a display, used by persons in crowded environments (e.g., trains, commuter vehicles, airplanes, etc.).

Further, persons other than the user cannot view the display screen, thereby preserving the confidentiality of sensitive information.

Additionally, the inventive device need not be attached separately when the device is to be put into use. Instead, the device is built-onto the display housing, and is operable or removable without physically separating the device from the computer or other display system.

Moreover, with the unique and unobvious structure of the present invention, a very inexpensive way of enhancing display privacy is provided, without resorting to removable attachments. The invention also provides a means for eliminating glare when a laptop is used outdoors, for example, in bright sun light, without moving the laptop to a shaded area and without necessarily adjusting the brightness/contrast dials on the display. At the same time, it becomes possible to reduce the screen brightness by forming a shroud around the display to reduce ambient light, thereby increasing running time, thereby conserving the battery charge (e.g., power).

Since the present invention requires no removable or separable components to meet the above-mentioned objects of the invention, a separate carrying case is not required as might occur in other approaches (e.g., providing a device which is attachable/removable when the item is to be operable/inoperable, respectively, etc.) to the problems addressed by and recognized first by the present inventor.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a perspective view of an optical shielding apparatus according to a preferred embodiment of the present invention for use with a display panel 3 of a portable (e.g., laptop) personal computer (PC) or the like;

DETAILED DESCRIPTION OF A PREFERRED EMBODIMENT OF THE INVENTION

Figure 1:
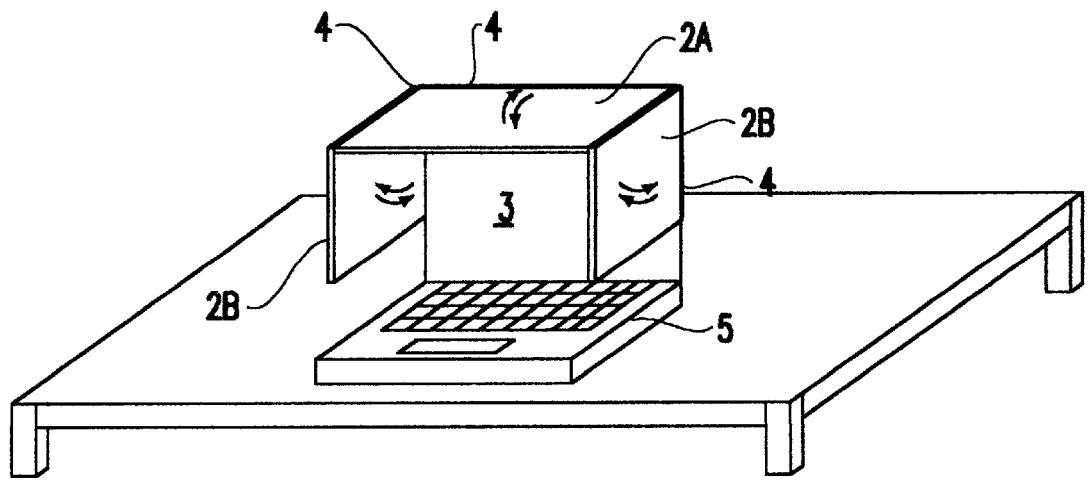

Referring now to the drawings, and more particularly to FIG. 1, there is shown a structure for achieving the above-described objects of the present invention and for use with an electronic device having a display such as a liquid crystal display (LCD), the display being contained within a housing.

For purposes of illustration only, the invention is described below with use of a portable (e.g., laptop) personal computer as the electronic device. Of course, other devices could similarly benefit from the present invention such as a personal, portable television monitor, a computer game station, etc.

As shown in FIG. 1, the structure 1 includes a plurality of foldable flaps, each preferably having a rectangular shape. Of course, any shape may be employed so long as the user's objectives are met, as would be known by one of ordinary skill in the art within the purview of the present application. In the preferred embodiment, one flap 2a is hinged from the top edge of a display 3, and other flaps 2b are hinged from side edges, of the display, respectively, by hinges 4.

Preferably, the top flap 2a has a dimension slightly less than the length and depth of the screen panel 3, and the side flaps 2b are similarly arranged. Preferably, the side flaps 2b are smaller than the top flap 2a, and the side flaps 2b do not overlap the edges of the panel when folded in their rest (e.g., not-in-use or inoperable) position.

Figure 2:
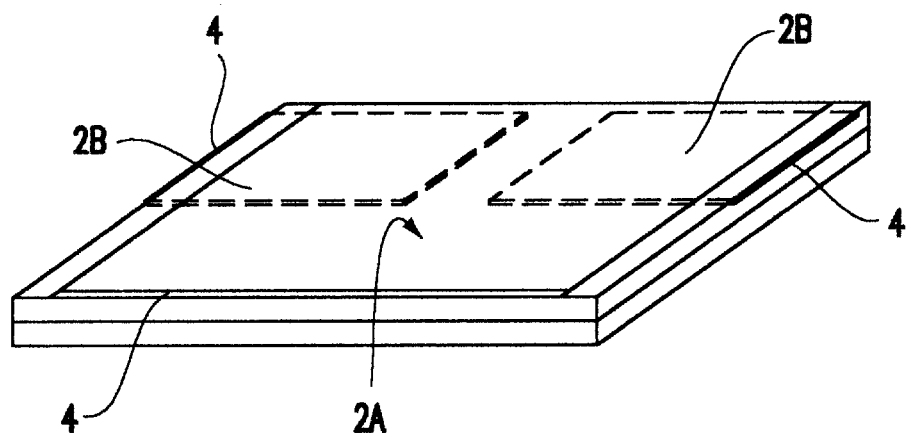
FIG. 2 illustrates a closed portable PC with a top flap 2a and side flaps 2b folded over onto the display panel 3 of the portable PC.
Figure 3:
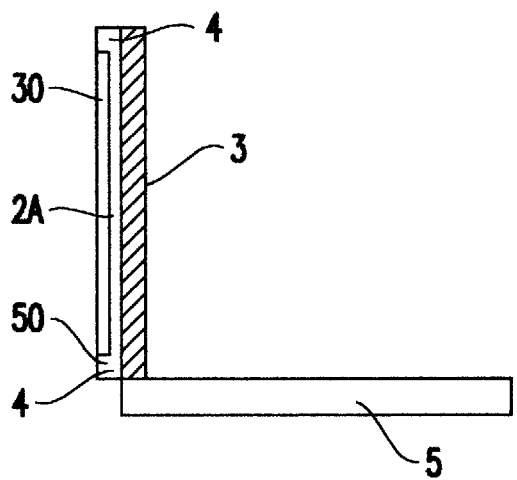
FIG. 3 is a side view of the display 3 and keyboard/processor portion 5 of the laptop computer, and a flap cover 30 therefor.
Figure 4:
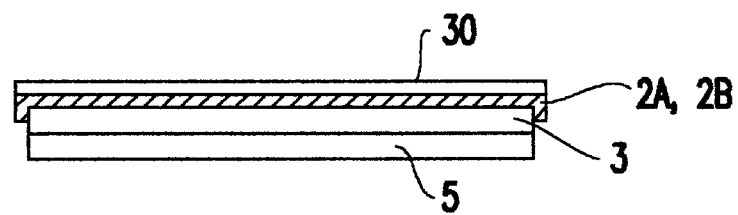
FIG. 4 illustrates a side view of the portable PC of FIG. 3 when closed with the top flap 2a and side flaps 2b folded over onto the back of the display 3.
Figure 5:
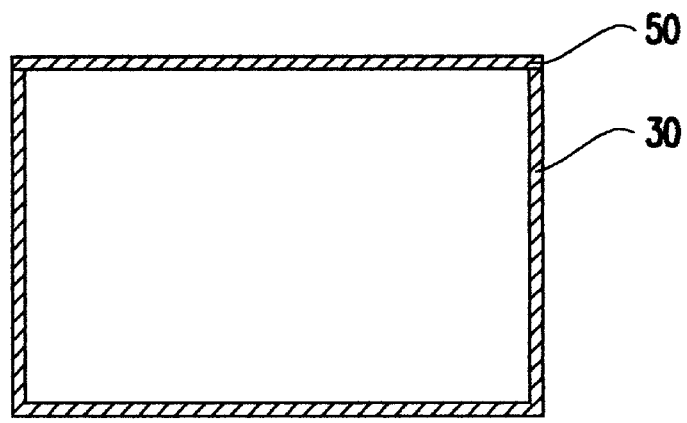
FIG. 5 illustrates a top view of the flap cover 30 on the portable computer and a hinge 50 for connection of the flap cover 30 to the portable computer.

When privacy is not needed (or when the computer is not being used), the flaps 2a, 2b are folded back so that the flaps rest parallel to and substantially flat on the back of the display panel 3, as shown in FIG. 2. Similarly, FIG. 3 is a side view of the apparatus with the display screen in a viewing position but the flaps closed, FIG. 4 is a side view of the apparatus with the display panel 3 with flaps closed, and FIG. 5 is a top view of the apparatus which shows a similar, closed state of the folded flaps.

When privacy is required, or when the laptop (or similar product including a display) is used in bright light which obscures the information on the liquid crystal display screen, the flaps 2a, 2b are folded forward, as shown in FIG. 1. The flaps are foldable to any angle up to 270 degrees from their rest position (e.g., non-use position), to form three parts of a four-part shroud.

The fourth component of the shroud is provided by the keyboard/processor portion 5 of the laptop. Obviously, the keyboard/processor portion 5 is not a component of the inventive shielding structure. For non-laptop devices, a fourth folding flap can be used. Thus, the set of retractable flaps limit the viewing angle of a liquid crystal display (or for that matter any display) when folded from their rest position, and the flaps are attached to the display 3 such that the flaps can be folded onto the back of the display 3 when not in use. FIG. 5 illustrates a top view of a flap cover 30 on the back of the display.

The flaps 2a, 2b may be attachable to the laptop computer casing directly, or may be hinged onto the outer edges of the display (e.g., a housing for the flat panel display), as shown in FIG. 1. The hinges 4 provide friction to permit the flaps to remain firmly in the position in which they are placed or folded by the user.

The flaps which form a shroud around the LCD preferably are formed from thin metal or opaque plastic sheets due to weight considerations. Specifically, the laptop is designed to be as light as possible, and providing a lightweight shroud assists in achieving such an object.

The inner surface of the shroud (e.g., flaps) preferably has a nontransparent, or opaque non-reflecting surface. Such a surface is provided, for example, by the use of flat black paint or the like. The flaps preferably are formed of at least one of sheet metal, plastic, and wood, or other similar opaque material.

As mentioned above, the flaps can be folded onto the back of the flat panel display 3 when not in use, as shown, for example, by FIGS. 3–5.

Specifically, though not necessarily in that order, first either or both the side flaps are folded over onto the back of the display. Then, the top flap is folded over the side flaps, to secure the same to the back of the display by the friction/rigidity of the hinges. Obviously, the top flap could be folded over first before either or both of the side flaps. Similarly, when the laptop computer is not in use, as shown in FIG. 2, the laptop display is closed by being folded over onto the keyboard section, as is conventional.

Thus, the flaps 2a, 2b form a solid structure intrinsic to the display each attachable by a hinge to the back of one edge of the flat panel display.

Additionally, the flaps 2a, 2b may be completely enclosed when not in use by a cover 30 as shown in FIGS. 3–5. The cover 30 provides a neat, tidy appearance, as well as protection for the flaps and the computer against droppage or the like. The cover 30 can be attached to the back of the display or the like by a hinge 50, as shown in FIG. 5.

As shown in FIGS. 3–5, the cover 30 may include a cloth cover attached to one edge of the back of the display which can be used to enclose the flaps when not in use. The cloth cover preferably is closed by any one or more of a zipper, snaps, buttons, Velcro®, or the like, to completely enclose the flaps when not in use. Thus, the flaps when not in use are not cumbersome and do not affect the user's ability to use and view the screen.

As mentioned above, each of the flaps 2a, 2b can be folded from their rest position on the back of the display by as much as approximately 270 degrees to form a shroud. Specifically, the flaps can be folded from the rest position having an angle of zero degrees formed by the flap and the back of the panel to any angle up to approximately 270 degrees.

Thus, the flaps form a shroud around the display when folded out to provide a limited viewing angle of the display.

Figures 6, 7:
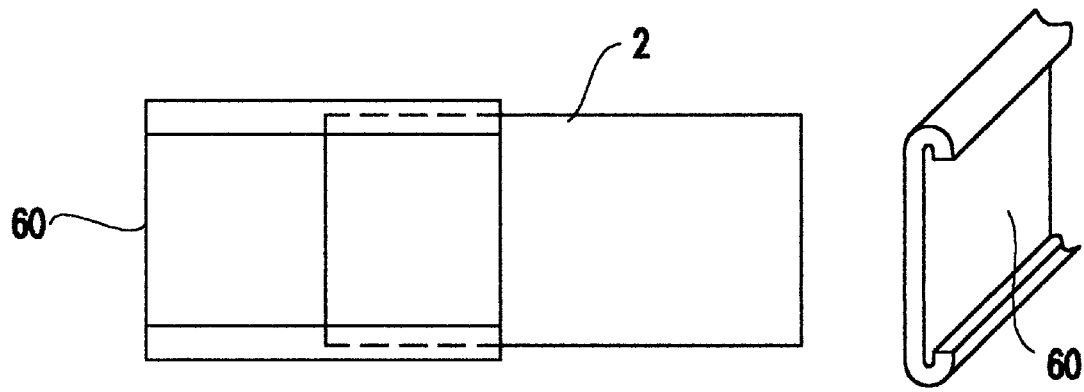
FIG. 6 is a side view of a telescoping extension 60 of the optical shielding apparatus of FIG. 1.
FIG. 7 is a perspective view of the telescoping extension 60 shown in FIG. 6.

As shown in FIGS. 6–7, a telescoping extension 60 also may be provided to each of the plurality (e.g., three in the preferred embodiment) of hinged panels, to provide a greater degree of viewing privacy. The telescoping extension 60 allows the laptop user (or other user/viewer of the display) to set the shroud to arbitrary lengths by choosing the degree of extension. Preferably, the telescoping extension 60 is made of the same material as the flaps, although this is not required.

The telescoping extension 60 may be formed by a plurality of sections, and can be fully retracted so that, in the unused position, there is no overhang that extends past the dimensions of the display panel 3. Thus, each of the flaps may be provided with the telescoped extension 60 for varying the length of each flap. FIG. 7 illustrates the extension 60 in greater detail. As shown, the extension 60 has curved portions for being retracted/extended. While not shown for brevity, a detent mechanism or the like (e.g., friction) may be provided on the extension and/or flap, to lock the extension 60 in place at the desired length. The extension 60 slides along the top and bottom edges of each flap. Thus, the top and bottom edges form rails for the extension 60 to slide upon.

Thus, with the unique and unobvious structure of the present invention, a very inexpensive way of enhancing display privacy is provided, without resorting to removable attachments. The apparatus of the present invention is inexpensive, light-weight, and also provides a means for eliminating glare when a laptop computer is used where the ambient light is bright (e.g., outdoors in bright sun light).

While the invention has been described in terms of a single preferred embodiment, those skilled in the art will recognize that the invention can be practiced with modification within the spirit and scope of the appended claims.

For example, while the embodiment above includes a top flap and two side flaps, in some applications it may be beneficial to mount side flaps from the bottom of the laptop computer (or other portable electronic device).

Further, while the above embodiment has been described for use with an LCD, other types of displays also would benefit from the present invention.

Having thus described my invention, what I claim as new and desire to secure by Letters Patent is as follows:

1. An apparatus for limiting the viewing angle of a display of an electronic device, said device including a housing for housing said display, said apparatus comprising:
    a pivoting device coupled to said housing; and
    a plurality of retractable flaps movable independently between a first position on a back of said housing and a second position on respective sides of said display and each respectively coupled to said pivoting device on outer edges of said display, said plurality of retractable flaps for limiting a viewing angle of said display when said flaps are moved from said back of said housing to said respective sides of said display.

2. The apparatus according to claim 1, wherein said display comprises a liquid crystal display (LCD), and
    wherein said plurality of flaps are attached to said housing of said LCD such that said flaps are foldable onto the back of said housing of said LCD.

3. The apparatus according to claim 1, wherein said display comprises a liquid crystal display (LCD), and
    wherein said plurality of flaps form a shroud around said LCD when unfolded to limit said viewing angle of said LCD.

4. The apparatus according to claim 1, wherein said plurality of flaps are opaque to visible light.

5. The apparatus according to claim 1, wherein said display comprises a liquid crystal display (LCD), and
    wherein said pivoting device comprises a plurality of hinges for respectively hinging said plurality of flaps onto outer edges of said LCD, said LCD comprising a flat panel display.

6. The apparatus according to claim 1, wherein said display comprises a liquid crystal display (LCD), and said electronic device comprises a portable computer,
    said pivoting device comprising a plurality of hinges respectively provided for said flaps, such that said plurality of flaps are hinged onto the housing of said LCD of said portable computer,
    wherein said first position comprises an inoperable position of said flaps and said second position comprises an operable position of said flaps.

7. The apparatus according to claim 1, wherein said electronic device comprises a portable computer, said plurality of flaps being attached to said portable computer.

8. The apparatus according to claim 1, wherein each flap of said plurality of flaps includes a telescoped extension for varying a length of said each flap.

9. The apparatus according to claim 1, wherein said plurality of flaps each include a substantially non-reflecting surface.

10. The apparatus according to claim 1, wherein said plurality of flaps further are for reducing ambient incident light, originating from external to said display, on said display.

11. The apparatus according to claim 4, wherein said plurality of flaps are formed from at least one of sheet metal, plastic, and wood.

12. The apparatus according to claim 6, wherein said hinges include friction hinges for providing friction for securing said flaps in position.

13. The apparatus according to claim 6, wherein said plurality of flaps are foldable onto the back of said housing of said LCD when in said first position.

14. The apparatus according to claim 6, further comprising a cover and a hinged member coupled thereto,
    said cover being attached by said hinged member to a back of one edge of said housing for completely enclosing the flaps when in said first position.

15. The apparatus according to claim 9, wherein said display comprises a liquid crystal display (LCD), and
    wherein said non-reflecting surface comprises a surface facing said LCD and having a non-reflecting coating applied thereto.

16. The apparatus according to claim 13, wherein each of said plurality of flaps are foldable from said first position on the back of the housing of said LCD by an angle up to substantially 270 degrees to form a shroud.

17. The apparatus according to claim 13, wherein said plurality of flaps are foldable from said first position to said second position,
    said first position comprising an angle of zero degrees formed by a respective flap and the back of the housing, and
    said second position comprising an angle, formed by the respective flap and the back of the housing, in a range of over zero degrees to substantially 270 degrees.

18. The apparatus according to claim 14, wherein said cover comprises a cloth cover attached to an edge of the back of the housing.

19. The apparatus according to claim 18, wherein said cloth cover includes at least one of a zipper, snaps, buttons, and Velcro® for closing said cloth cover to enclose the flaps when in said first position.

20. A portable electronic device, comprising:
    a housing;
    a liquid crystal display (LCD) provided in said housing; and
    an apparatus for limiting the viewing angle of said LCD, said apparatus including:
        a plurality of retractable flaps moveable independently between a first position on a back of said housing and a second position on respective sides of said display and each respectively coupled to said housing about outer edges of said display, said plurality of flaps for limiting a viewing angle of said LCD when said flaps are moved from said back of said housing to said respective sides of said display.

21. The portable electronic device according to claim 20, wherein said plurality of flaps are attached to said housing of said LCD such that said flaps are foldable onto a back of said housing.

22. The portable electronic device according to claim 20, wherein said plurality of flaps further are for reducing ambient incident light, originating from external to said display, on said display.

23. The portable electronic device according to claim 21, wherein said plurality of flaps each include a substantially non-reflecting surface.

24. The portable electronic device according to claim 23, wherein said non-reflecting surface comprises a surface facing said LCD and having a non-reflecting coating applied thereto.

25. An electronic device, comprising:
   a housing;
   a display provided in said housing; and
   an apparatus for limiting the viewing angle of said display, said apparatus including:
      a plurality of retractable flaps moveable independently between a first position on a back of said housing and a second position on respective sides of said display and each respectively coupled to said housing about outer edges of said display, said plurality of flaps for limiting a viewing angle of said display when said flaps are moved from said back of said housing to said respective sides of said display.

26. The electronic device according to claim 25, wherein said plurality of flaps each include a substantially non-reflecting surface.

27. The electronic device according to claim 25, wherein said plurality of flaps further are for reducing ambient incident light, originating from external to said display, on said display.

28. The electronic device according to claim 26, wherein said non-reflecting surface comprises a surface facing said display and having a non-reflecting coating applied thereto.

29. An apparatus for limiting the viewing angle of a display of an electronic device, said device including a housing for housing said display, said apparatus comprising:
   a pivoting device coupled to said housing; and
   a plurality of retractable flaps movable between a first position on a back of said housing and a second position on respective sides of said display and each respectively coupled to said pivoting device, said plurality of retractable flaps for limiting a viewing angle of said display when said flaps are moved from said back of said housing to said respective sides of said display, and
   wherein said plurality of flaps each include a substantially non-reflecting surface, said display comprises a liquid crystal display (LCD) and said non-reflecting surface comprises a surface facing said LCD and having a non-reflecting coating applied thereto.

30. An apparatus for limiting the viewing angle of a display of an electronic device, said device including a housing for housing said display, said apparatus comprising:
   a pivoting device coupled to said housing; and
   a plurality of retractable flaps movable between a first position on a back of said housing and a second position on respective sides of said display and each respectively coupled to said pivoting device, said plurality of retractable flaps for limiting a viewing angle of said display when said flaps are moved from said back of said housing to said respective sides of said display,
   wherein said plurality of flaps further are for reducing ambient incident light on said display originating from external to said display.

31. An apparatus for limiting the viewing angle of a display of an electronic device, said device including a housing for housing said display, said apparatus comprising:
   a pivoting device coupled to said housing; and
   a plurality of retractable flaps movable between a first position on a back of said housing and a second position on respective sides of said display and each respectively coupled to said pivoting device, said plurality of retractable flaps for limiting a viewing angle of said display when said flaps are moved from said back of said housing to said respective sides of said display, wherein said plurality of flaps are opaque to visible light.

32. An apparatus for limiting the viewing angle of a display of an electronic device, said device including a housing for housing said display, said apparatus comprising:
   a pivoting device coupled to said housing; and
   a plurality of retractable flaps movable between first and second positions and respectively coupled to said pivoting device, said plurality of retractable flaps for limiting a viewing angle of said display when said flaps are moved from said first position to said second position, wherein each flap of said plurality of flaps includes a telescoped extension for varying a length of said each flap.

* * * * *